United States Patent
Yamada

[19]

[11] Patent Number: 6,035,071
[45] Date of Patent: Mar. 7, 2000

[54] IMAGE PROCESSING METHOD AND APPARATUS

[75] Inventor: Masahiko Yamada, Kanagawa-ken, Japan

[73] Assignee: Fuji Photo Film Co., Ltd., Kanagawa-ken, Japan

[21] Appl. No.: 08/912,847

[22] Filed: Aug. 19, 1997

[30] Foreign Application Priority Data

Aug. 19, 1996 [JP] Japan ................................. 8-217334

[51] Int. Cl.[7] ........................................................ G06K 9/40
[52] U.S. Cl. ........................................... 382/263; 382/266
[58] Field of Search ................................ 382/213, 191, 382/263, 266, 283, 130; 250/587

[56] References Cited

U.S. PATENT DOCUMENTS

| | | | |
|---|---|---|---|
| 4,315,318 | 2/1982 | Kato et al. ............................. | 364/515 |
| 4,317,179 | 2/1982 | Kato et al. ............................. | 364/515 |
| 4,819,188 | 4/1989 | Matsubara et al. .................... | 250/587 |
| 4,903,205 | 2/1990 | Hishinuma ............................. | 382/130 |
| 5,051,902 | 9/1991 | Hishinuma ............................. | 382/263 |
| 5,485,534 | 1/1996 | Takemoto et al. ..................... | 382/263 |
| 5,748,799 | 5/1998 | Shimura ................................. | 382/266 |

*Primary Examiner*—Yon J. Couso
*Attorney, Agent, or Firm*—Sughrue, Mion, Zinn, Macpeak & Seas, PLLC

[57] ABSTRACT

Unsharp mask image signals are formed from an original image signal, and band-limited image signals are formed from the original image signal and the unsharp mask image signals. Each of the band-limited image signals is converted in accordance with one of converting functions, and converted image signals are thereby formed. An integration signal obtained by integrating the converted image signals is added to the original image signal, and a processed image signal, in which predetermined frequency components of the original image signal have been emphasized, is thereby obtained. The converting functions are defined by specifying desired frequency response characteristics of the processed image signal, and determining definition parameters for the converting functions in accordance with the specified frequency response characteristics. Even users having little experience can thus easily adjust the definition parameters and can obtain the processed image signal having the desired frequency response characteristics.

4 Claims, 11 Drawing Sheets

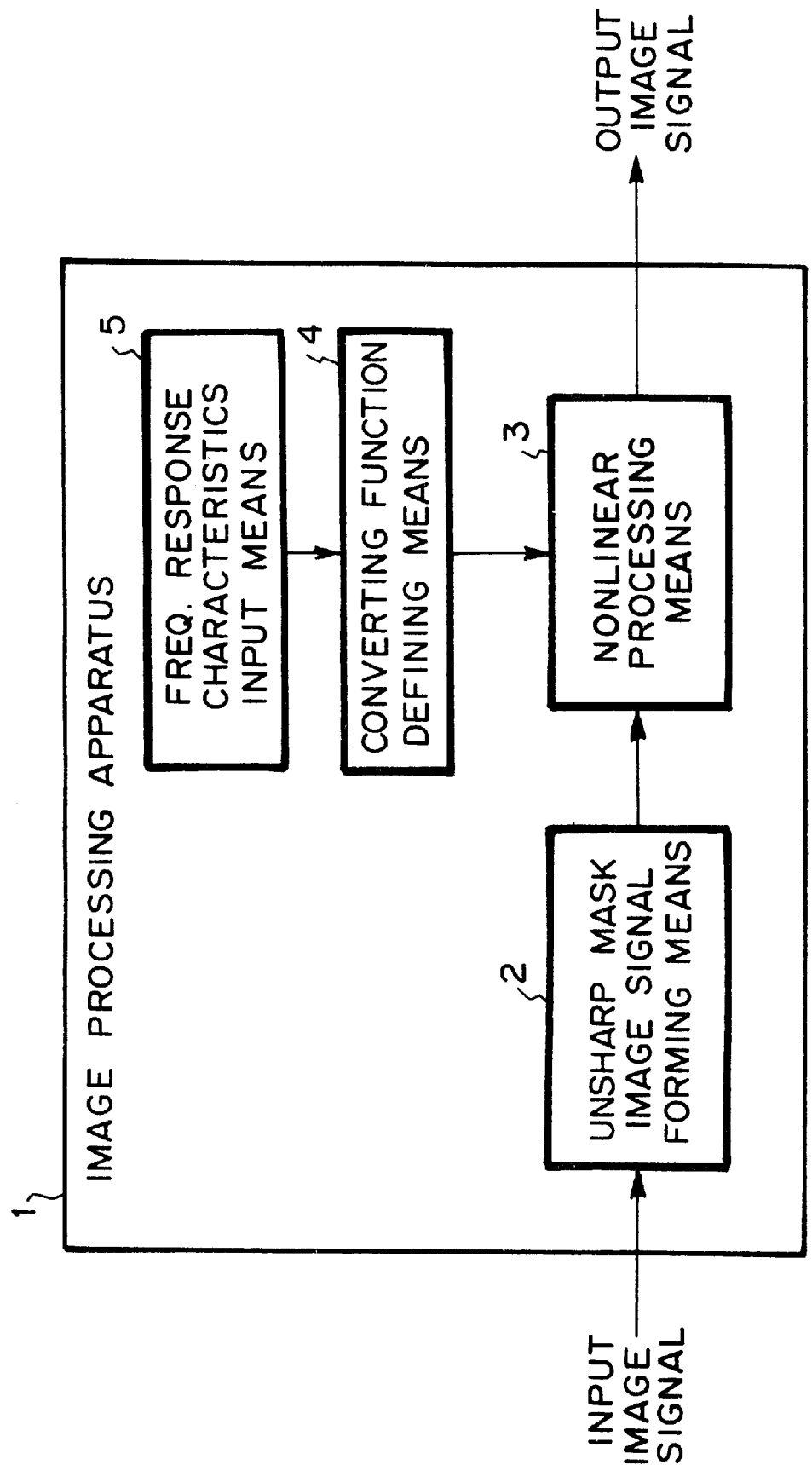

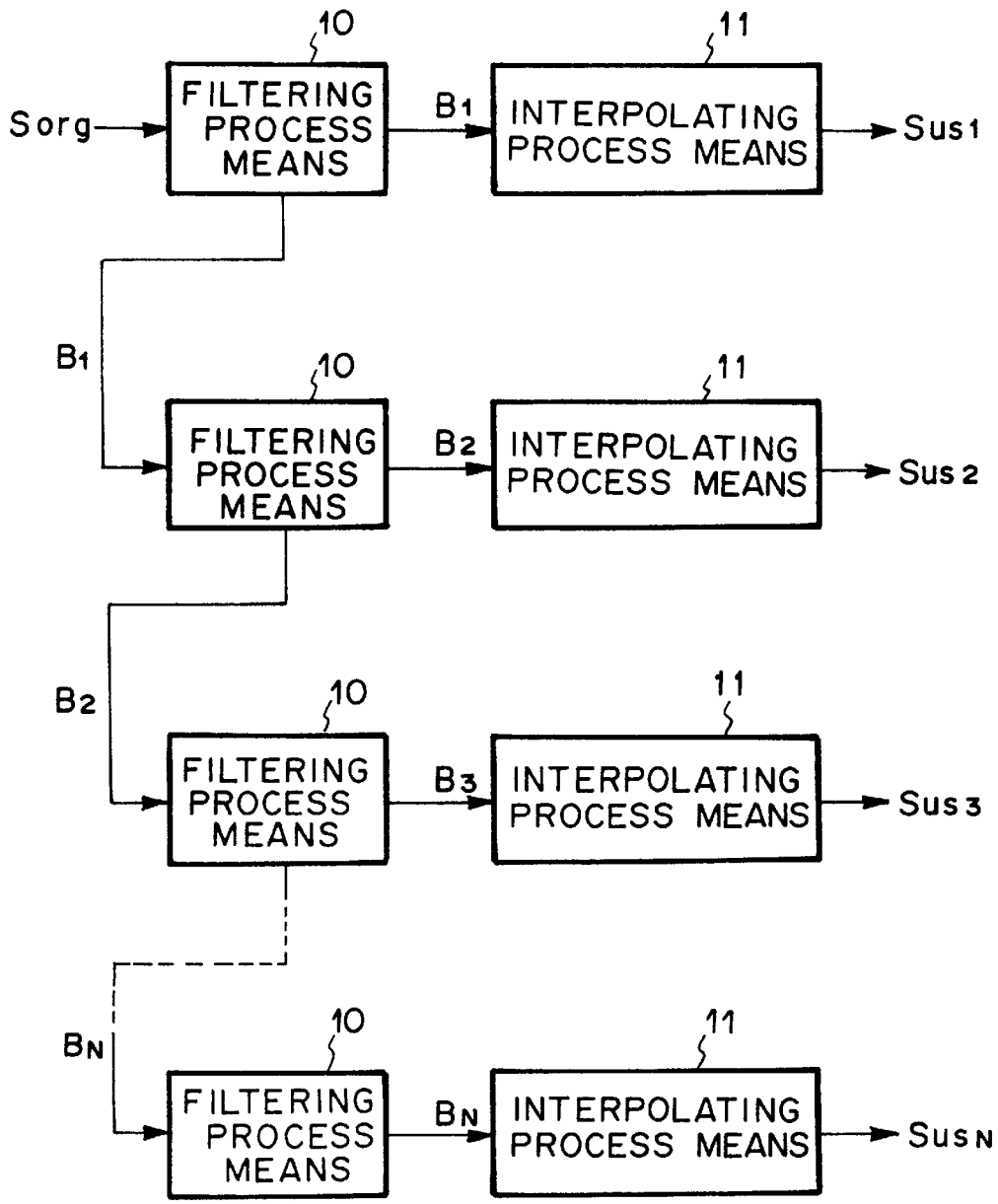

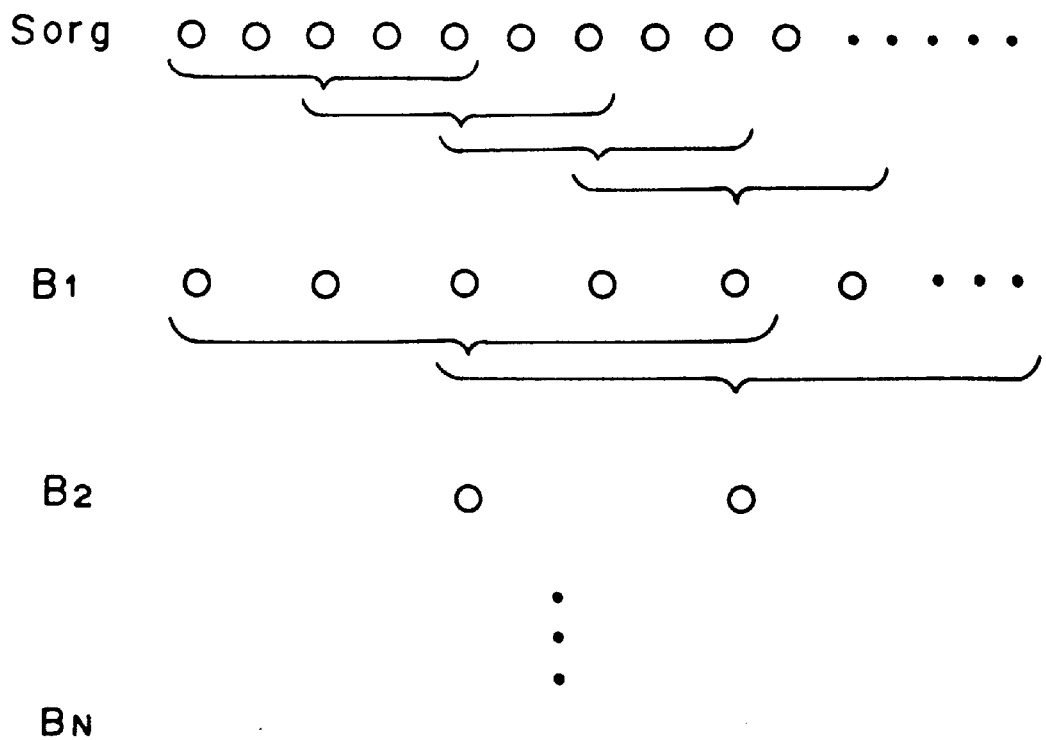

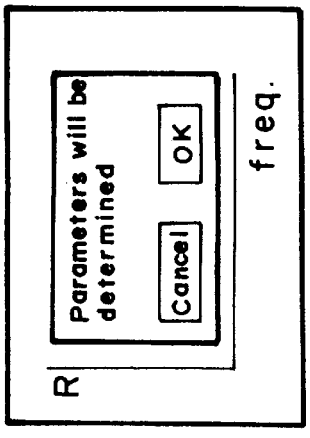
FIG.13A
DISPLAY OF FREQ. RESPONSE CHARACTERISTICS WITH CURRENT PARAMETERS
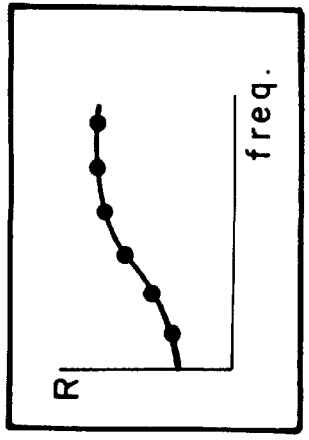
FIG.13B
INPUT OF FREQ. RESPONSE CHARACTERISTICS BY MOVING INDICATIVE POINTS
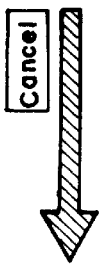
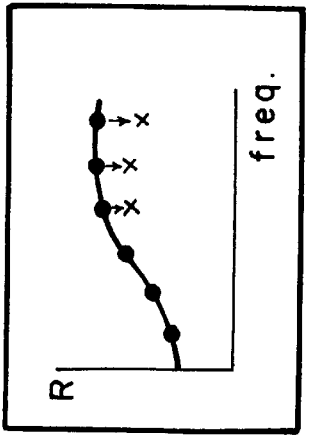
FIG.13C
DISPLAY OF FREQ. RESPONSE CHARACTERISTICS WITH PARAMETERS CALCULATED ACCORDING TO INPUTTED CHARACTERISTICS
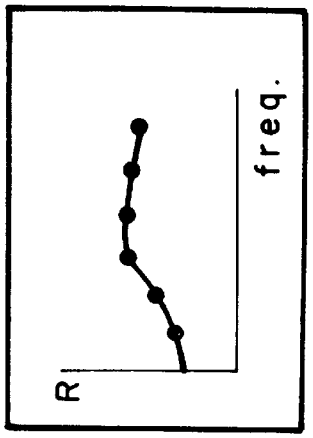
FIG.13D
CONFIRMATION
START OF NONLINEAR PROCESSING

IMAGE PROCESSING METHOD AND APPARATUS

BACKGROUND OF THE INVENTION

1. Field of the Invention

This invention relates to an image processing method and apparatus for emphasizing predetermined frequency components of an image signal. This invention particularly relates to automatic setting of an image processing parameter for obtaining desired results of image processing.

2. Description of the Prior Art

The applicant has proposed various image processing methods and apparatuses, wherein frequency emphasis processing is carried out by using an unsharp mask image signal, and a radiation image, which has good image quality and can serve as an effective tool in, particularly, the efficient and accurate diagnosis of an illness, is thereby obtained. (Such techniques are described in, for example, U.S. Pat. Nos. 4,315,318 and 4,317,179.) The unsharp mask image signal represents an image, which is constituted of the same number of picture elements as that of the picture elements of the original image represented by an original image signal, and has sharpness lower than the sharpness of the original image. The unsharp mask image signal has the frequency response characteristics such that the high frequency components of the original image signal, which are not lower than a predetermined frequency, may have been removed.

With the frequency emphasis processing, an unsharp mask image signal Sus is subtracted from an original image signal Sorg, and the obtained difference value is multiplied by an emphasis coefficient β. The resulting product is then added to the original image signal Sorg. In this manner, predetermined frequency components of the original image signal Sorg can be emphasized. The frequency emphasis processing may be represented by Formula (1) shown below.

$$Sproc = Sorg + \beta \times (Sorg - Sus) \quad (1)$$

wherein Sproc represents the signal obtained from the frequency emphasis processing, Sorg represents the original image signal, Sus represents the unsharp mask image signal, and β represents the emphasis coefficient.

With the frequency emphasis processing described above, problems often occur in that an artifact occurs due to the addition of the signals. The problems can be solved by adjusting the frequency response characteristics of the addition signal, which is added to the original image signal Sorg. A technique for adjusting the frequency response characteristics has been proposed in, for example, U.S. Ser. No. 08/723,313.

In the proposed technique for adjusting the frequency response characteristics, firstly, a plurality of unsharp mask image signals, which represent images having different levels of sharpness, i.e. which have different frequency response characteristics, are formed from the original image signal. Thereafter, a calculation is made to find the difference between two signals, which are among the original image signal and the unsharp mask image signals. The calculation is made for each of sets of two signals, which are among the original image signal and the unsharp mask image signals. In this manner, a plurality of band-limited image signals (hereinbelow often referred to as the band pass signals), each of which represents the frequency components of the original image signal falling within a certain limited frequency band, are formed. Further, the band pass signals are restricted to desired levels by using different converting functions, and the plurality of the restricted band pass signals are integrated. In this manner, the aforesaid addition signal is formed. The processing thus carried out may be represented by, for example, Formula (2) shown below.

$$Fusm(Sorg, Sus1, Sus2, ..., SusN) = \quad (2)$$
$$\{f_1(Sorg - Sus1) + f_2(Sus1 - Sus2) + ... +$$
$$f_k(Susk - 1 - Susk) + ... + f_N(SusN - 1 - SusN)\} ...$$

wherein Sproc represents the processed image signal, in which the high frequency components have been emphasized, Sorg represents the original image signal, Susk (k=1 to N) represents the unsharp mask image signal, $f_k$(k=1 to N) represents the converting function for converting each band pass signal, and β(Sorg) represents the emphasis coefficient determined in accordance with the original image signal.

With the proposed technique for adjusting the frequency response characteristics, the frequency response characteristics of the addition signal, which is to be added to the original image signal Sorg, can be adjusted by altering the definition of each of the converting functions $f_1$ to $f_N$ for converting the band pass signals. Therefore, in order for an artifact to be prevented from occurring, the converting functions $f_1$ to $f_N$ may be defined as functions such that an image signal having frequency response characteristics causing no artifact to occur can be formed. Further, besides the purposes for preventing an artifact from occurring, a processed image signal having desired frequency response characteristics can be obtained in accordance with the definition of each converting function.

However, in cases where each converting function is to be defined actually in accordance with the technique described above, how each converting function is to be defined such that desired results can be obtained cannot be found easily from a formula, such as Formula (2) shown above. Therefore, heretofore, each converting function has been defined by adjusting a parameter (e.g., the inclination of the function), which defines the converting function, little by little while an image obtained from the emphasis processing is being seen. The defining work is difficult for users having little experience to carry out. Even for users experienced in such work, considerable time and labor are required to carry out the defining work.

SUMMARY OF THE INVENTION

The primary object of the present invention is to provide an image processing method, with which even users having little experience are capable of easily adjusting a definition parameter for a converting function for a band-limited image signal and obtaining a processed image signal having desired frequency response characteristics.

Another object of the present invention is to provide an apparatus for carrying out the image processing method.

The present invention provides an image processing method, comprising the steps of:

i) forming a plurality of unsharp mask image signals, which have different frequency response characteristics, from an original image signal representing an original image, ii) forming a plurality of band-limited image signals, each of which represents one of signals falling within a plurality of different frequency bands of the original image signal, from the original image signal and the plurality of the unsharp mask image signals, or from the plurality of the unsharp mask image signals, iii) converting each of the band-limited image signals in accordance with one of a plurality of converting functions, a plurality of converted image signals being thereby formed, iv) integrating the plurality of the converted image signals, an integration signal being thereby obtained, and v) adding the integration signal to the original image signal, whereby a processed image signal, in which predetermined frequency components of the original image signal have been emphasized, is obtained, wherein the improvement comprises the steps of:

a) specifying desired frequency response characteristics of the processed image signal, and b) determining definition parameters for the converting functions in accordance with the specified frequency response characteristics, the converting functions being thereby defined.

The present invention also provides an apparatus for carrying out image processing with the image processing method in accordance with the present invention. Specifically, the present invention also provides an image processing apparatus, comprising:

i) an unsharp mask image signal forming means for forming a plurality of unsharp mask image signals, which have different frequency response characteristics, from an original image signal representing an original image, and ii) a nonlinear processing means for:

forming a plurality of band-limited image signals, each of which represents one of signals falling within a plurality of different frequency bands of the original image signal, from the original image signal and the plurality of the unsharp mask image signals, or from the plurality of the unsharp mask image signals, converting each of the band-limited image signals in accordance with one of a plurality of converting functions, a plurality of converted image signals being thereby formed, integrating the plurality of the converted image signals, an integration signal being thereby obtained, and adding the integration signal to the original image signal, whereby a processed image signal, in which predetermined frequency components of the original image signal have been emphasized, is obtained, wherein the improvement comprises the provision of:

a) a frequency response characteristics input means for specifying desired frequency response characteristics of the processed image signal, and b) a converting function defining means for determining definition parameters for the converting functions in accordance with the specified frequency response characteristics, and thereby defining the converting functions.

The unsharp mask image signal represents an image, which is constituted of the same number of picture elements as that of the picture elements of the original image represented by the original image signal, and has sharpness lower than the sharpness of the original image. The unsharp mask image signal may be formed in the manner described below. Specifically, a predetermined filtering process is carried out with respect to each of picture elements of the original image represented by the original image signal, which are selected at predetermined intervals, and the picture elements are thereby thinned out. The same filtering process is then repeated on the image signal, which has been obtained from the aforesaid filtering process. The filtering process is thus carried out successively on the image signals, which are thus obtained successively, and a plurality of filtering-processed image signals representing the filtering-processed images constituted of a reduced number of picture elements are thereby formed. Thereafter, an interpolating process is carried out on each of the filtering-processed image signals and in accordance with a predetermined interpolating operation, such that the number of picture elements constituting each filtering-processed image may become identical with the number of picture elements of the original image. As for each of the filtering process and the interpolating process, one of various known techniques may be employed.

By way of example, each of the band-limited image signals, which represents one of signals falling within a plurality of different frequency bands of the original image signal, may be formed by calculating the difference between the unsharp mask image signals of two adjacent frequency bands. Alternatively, each of the band-limited image signals may be formed by calculating the difference between the original image signal and one of the unsharp mask image signals. As another alternative, each of the band-limited image signals may be formed by making a calculation of the difference with respect to one of the other combinations of the original image signal and the unsharp mask image signals or one of the other combinations of the unsharp mask image signals. The processing for the formation of the converted image signals, the formation of the integration signal, and the addition of the integration signal to the original image signal may be represented by, for example, Formula (2) shown above.

The term "emphasizing predetermined frequency components" as used herein means, for example, emphasizing the high frequency components such that an image edge portion may be emphasized.

In order for the desired frequency response characteristics of the processed image signal to be specified, several frequency levels may be displayed on an operation screen, and the user may input the desired frequency response characteristics as numerical values with respect to each of the several frequency levels. Alternatively, a graph representing the frequency response characteristics of an image signal, which has been obtained from the frequency emphasis processing, may be displayed on an operation screen, and the user may alter the pattern of the graph to a desired pattern by using a pointing device, such as a mouse device.

In the image processing method and apparatus in accordance with the present invention, the definition parameters for the converting functions are determined in accordance with the specified frequency response characteristics, and the converting functions are thereby defined. For such purposes, for example, relational expressions of the frequency response characteristics of the band-limited image signals, the desired frequency response characteristics having been specified, and the definition parameters for the converting functions may be solved as simultaneous equations, in which the frequency response characteristics of the band-limited image signals and the desired frequency response characteristics having been specified are taken as known values, and in which the definition parameters for the converting functions are taken as variables. In this manner, the definition parameters may be calculated.

With the image processing method and apparatus in accordance with the present invention, the definition parameters for the converting functions, which are to be used in the image processing, are calculated backwards from the desired frequency response characteristics having been specified, and the image processing is carried out by using the converting functions, which are defined by the calculated definition parameters. Therefore, the image processing for obtaining an image signal having the specified frequency response characteristics can be carried out by merely specifying the desired frequency response characteristics. Accordingly, it is not necessary to carry out the operation of trial and error for the determination of the definition parameters, and even the users having little experience can easily carry out the image processing, such that a desired image signal may be obtained.

BRIEF DESCRIPTION OF THE DRAWINGS

FIG. 1 is a block diagram showing an embodiment of the image processing apparatus in accordance with the present invention, FIG. 2 is a block diagram showing how a plurality of unsharp mask image signals are formed, FIG. 3 is an explanatory view showing an example of a filter, which is used in a filtering process, FIG. 4 is an explanatory view showing how a plurality of low-resolution image signals are formed, FIG. 5 is an explanatory view showing an example of a filter, which is used in an interpolating and enlarging process, FIGS. 13A, 13B, 13C, and 13D are explanatory views showing an example of a user interface for specifying frequency response characteristics.

DESCRIPTION OF THE PREFERRED EMBODIMENTS

Figure 6:
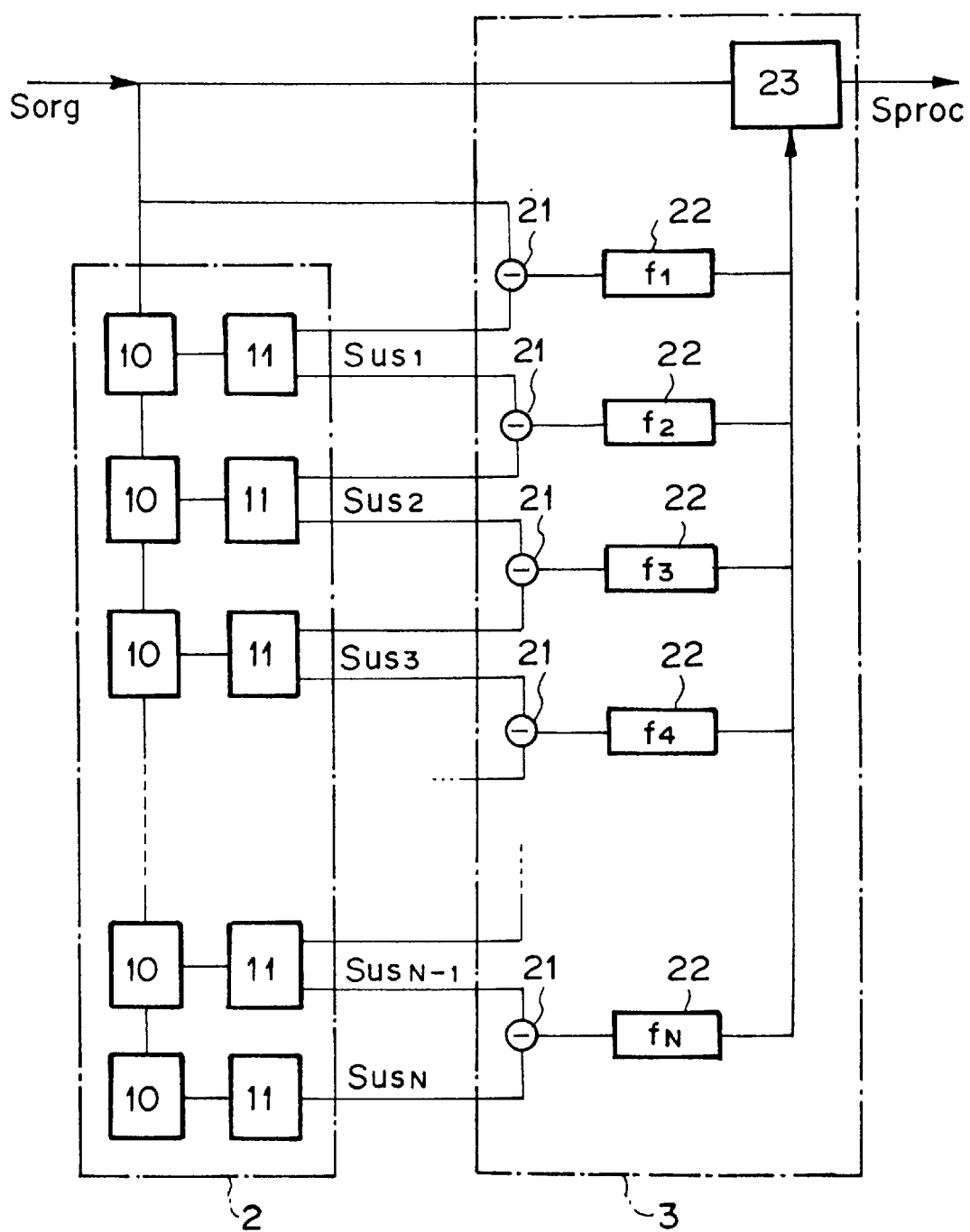
FIG. 6 is a block diagram showing an example of a frequency emphasis processing apparatus.

The present invention will hereinbelow be described in further detail with reference to the accompanying drawings.

In the embodiment described below, unsharp mask image signals are formed from an original image signal having been obtained by reading out a radiation image of a human body from a stimulable phosphor sheet, on which the radiation image has been recorded. Frequency emphasis processing is then carried out by using the unsharp mask image signals such that an image may be obtained, which has good image quality and can serve as an effective tool in the efficient and accurate diagnosis of an illness. A visible image is then reproduced on photographic film, or the like, from the processed image signal, which has been obtained from the processing. The visible image is utilized in making a diagnosis.

FIG. 1 is a block diagram showing an embodiment of the image processing apparatus in accordance with the present invention. With reference to FIG. 1, an image processing apparatus 1 comprises an unsharp mask image signal forming means 2 for forming unsharp mask image signals, and a nonlinear processing means 3 for carrying out a frequency emphasis processing such that specific frequency components may be emphasized. The image processing apparatus 1 further comprises a converting function defining means 4 and a frequency response characteristics input means 5. The converting function defining means 4 defines converting functions, which are used for a converting process carried out by the nonlinear processing means 3. The converting functions are defined by determining definition parameters, such as inclinations of the functions. The frequency response characteristics input means 5 enables the user to specify the frequency response characteristics, which are desired for an image signal to be obtained from the frequency emphasis processing. The converting function defining means 4 determines the parameters in accordance with the frequency response characteristics, which have been specified by the user from the frequency response characteristics input means 5.

How the unsharp mask image signals are formed will be described hereinbelow. FIG. 2 is a block diagram showing how a plurality of unsharp mask image signals are formed. As illustrated in FIG. 2, in the unsharp mask image signal forming means 2 shown in FIG. 1, a filtering process means 10 carries out a filtering process on an original image signal Sorg. The filtering process is carried out along each of x and y directions in the array of picture elements of the original image, which is represented by the original image signal Sorg. In this manner, a first low-resolution image signal $B_1$, which has resolution lower than the resolution of the original image signal Sorg, is formed. Thereafter, the filtering process is carried out in the same manner on the first low-resolution image signal $B_1$, and a second low-resolution image signal $B_2$, which has resolution lower than the resolution of the first low-resolution image signal $B_1$, is thereby formed. The filtering process is further carried out successively on respective low-resolution image signals, which are thus obtained successively. Also, an interpolating process means 11 carries out an interpolating and enlarging process on each of the low-resolution image signals $B_k$, which are obtained in the respective stages of the filtering process. From the interpolating and enlarging process, a plurality of unsharp mask image signals Sus1 through SusN, which have different levels of sharpness, are obtained.

In this embodiment, as the filter for the filtering process, a filter approximately corresponding to a one-dimensional Gaussian distribution is employed. Specifically, the filter factor of the filter is determined in accordance with Formula (3) shown below, which concerns the Gaussian signal.

$$f(t) = e^{-\frac{t^2}{2\sigma^2}} \qquad (3)$$

The Gaussian signal has good locality characteristics both in the frequency space and in the spatial domain and is therefore utilized in this embodiment. For example, in cases where σ=1 in Formula (3) shown above, the filter becomes identical with a 5×1 one-dimensional filter shown in FIG. 3.

FIG. 4 is an explanatory view showing how a plurality of low-resolution image signals are formed. As illustrated in FIG. 4, the filtering process is carried out with respect to the image signal components of the original image signal Sorg or each low-resolution image signal, which represent the picture elements located at every second row and every second column in the array of picture elements of the original image or the low-resolution image represented by the low-resolution image signal. In cases where the filtering process with respect to each of the picture elements of the original image, which are selected at intervals of a single picture element, is thus carried out along each of the x and y directions in the array of the picture elements, the first low-resolution image signal $B_1$ is obtained, which represents a first low-resolution image having a size ¼ times (½ times in each of the x direction and the y direction) as large as the size of the original image. The filtering process is carried out successively on the low-resolution image signals, which are obtained successively from the filtering process, and n number of low-resolution image signals $B_k$, where k=1 to n, are thereby obtained. Each of the low-resolution image signals $B_k$ represents the low-resolution image, which is constituted of a number of picture elements $½^{2k}$ times as large as the number of picture elements of the original image.

How the interpolating and enlarging process is carried out on the thus obtained low-resolution image signals $B_k$ will be described hereinbelow. As the interpolating operation technique, one of various techniques, such as a B spline technique, may be employed. In this embodiment, the low pass filter in accordance with the Gaussian signal is used in the aforesaid filtering process, and therefore a Gaussian signal is also utilized in the interpolating operation. Specifically, the Gaussian signal represented by Formula (4)

$$I(t) = 2 \cdot \sigma \cdot e^{-\frac{t^2}{2\sigma^2}} \quad (4)$$

wherein σ=$2^{k-1}$, is utilized.

In the interpolating process for the low-resolution image signal $B_1$, k=1 and therefore σ=1. In such cases, the filter for carrying out the interpolating process becomes identical with a 5×1 one-dimensional filter shown in FIG. 5. In the interpolating process, firstly, a single picture element having a value of 0 is inserted between two adjacent picture elements in the low-resolution image represented by the low-resolution image signal $B_1$. In this manner, the size of the low-resolution image represented by the low-resolution image signal $B_1$ is enlarged to the same size as the size of the original image. Thereafter, in the interpolating process, a filtering process is carried out on the low-resolution image signal $B_1$, which has been obtained from the insertion of the picture elements having a value of 0, by using the one-dimensional filter shown in FIG. 5.

The interpolating and enlarging process described above is carried out on all of the low-resolution image signals $B_k$. In the interpolating operation for the low-resolution image signals $B_k$, a filter having a length of $3 \times 2^{k-1}$ is prepared in accordance with Formula (4) shown above. Also, $2^k-1$ number of picture elements having a value of 0 are inserted between two adjacent picture elements of each low-resolution image signal $B_k$, and the size of the low-resolution image represented by the low-resolution image signal $B_k$ is thereby enlarged to the same size as that of the original image. Thereafter, the filtering process is carried out on the low-resolution image signal $B_k$, which has been obtained from the insertion of the picture elements having a value of 0, by using the filter having a length of $3 \times 2^k-1$. The interpolating and enlarging process is carried out in this manner.

An example of the nonlinear processing, which is carried out by using the unsharp mask image signals having been formed in the manner described above, will be described hereinbelow. In the nonlinear processing described below, specific frequency components are emphasized, and the original image signal and the unsharp mask image signals are processed in accordance with Formula (2) shown above.

Figure 7:
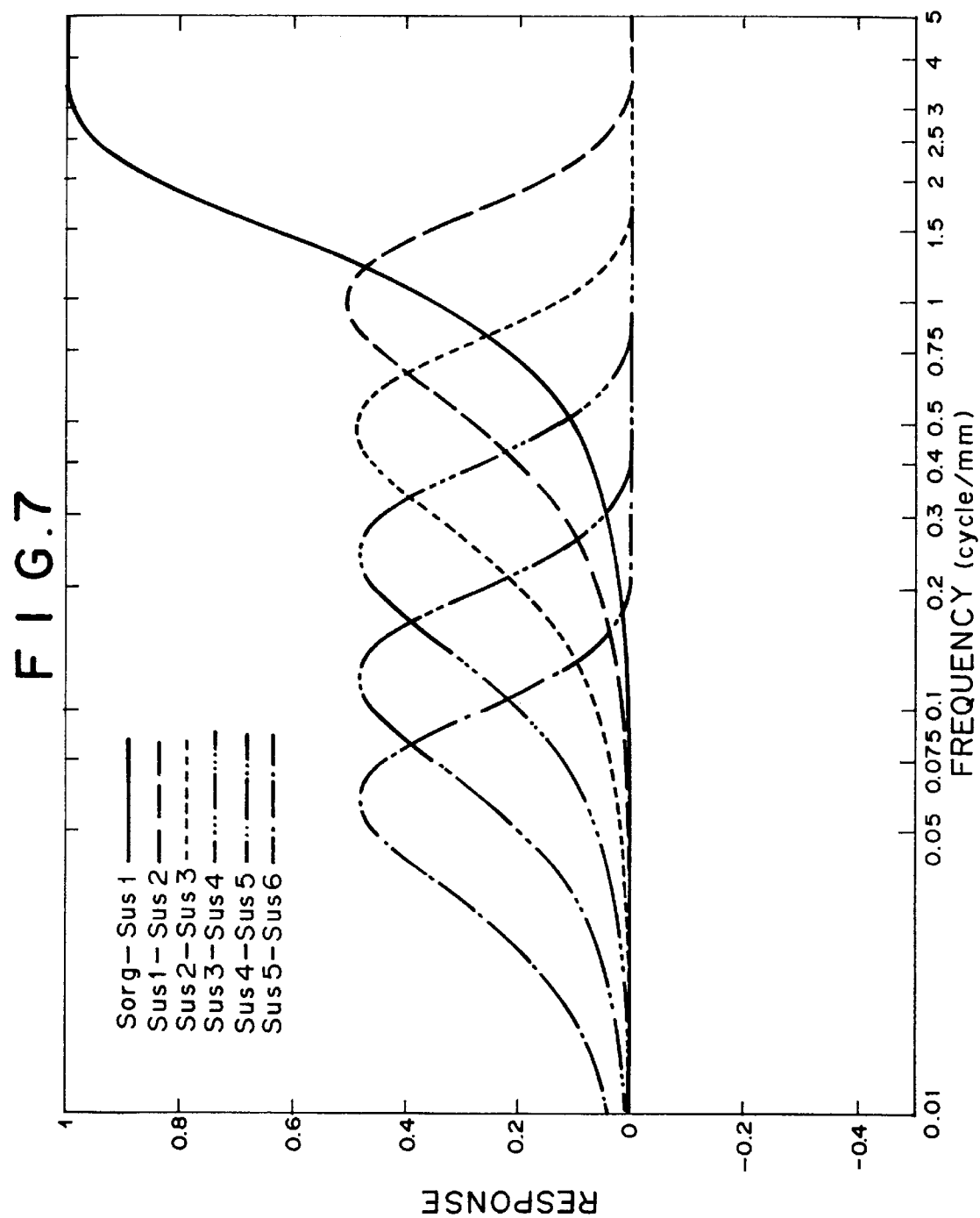
FIG. 7 is a graph showing examples of frequency response characteristics of band pass signals.

FIG. 6 is a block diagram showing an example of a frequency emphasis processing apparatus for carrying out the nonlinear processing. As illustrated in FIG. 6, each of band pass signals is obtained from a subtracter 21, which subtracts the unsharp mask image signals Susk of two adjacent frequency bands (as for the original image signal Sorg, Sorg and Sus1) from each other. FIG. 7 shows examples of the frequency response characteristics of the band pass signals, which have been formed in this manner. In FIG. 7, the frequency response characteristics of six band pass signals (Sorg-Sus1), (Sus1-Sus2), (Sus2-Sus3), (Sus3-Sus4), (Sus4-Sus5), and (Sus5-Sus6) are shown. Each of the band pass signals is then restricted to a desired level by a converter 22 in accordance with the corresponding one of functions $f_1$ through $f_N$. Thereafter, in accordance with Formula (2) shown above, the plurality of the restricted band pass signals are integrated by an operation device 23, and an integration signal is thereby obtained. The integration signal is then added to the original image signal, and a processed image signal Sproc is thereby formed.

Figure 8:
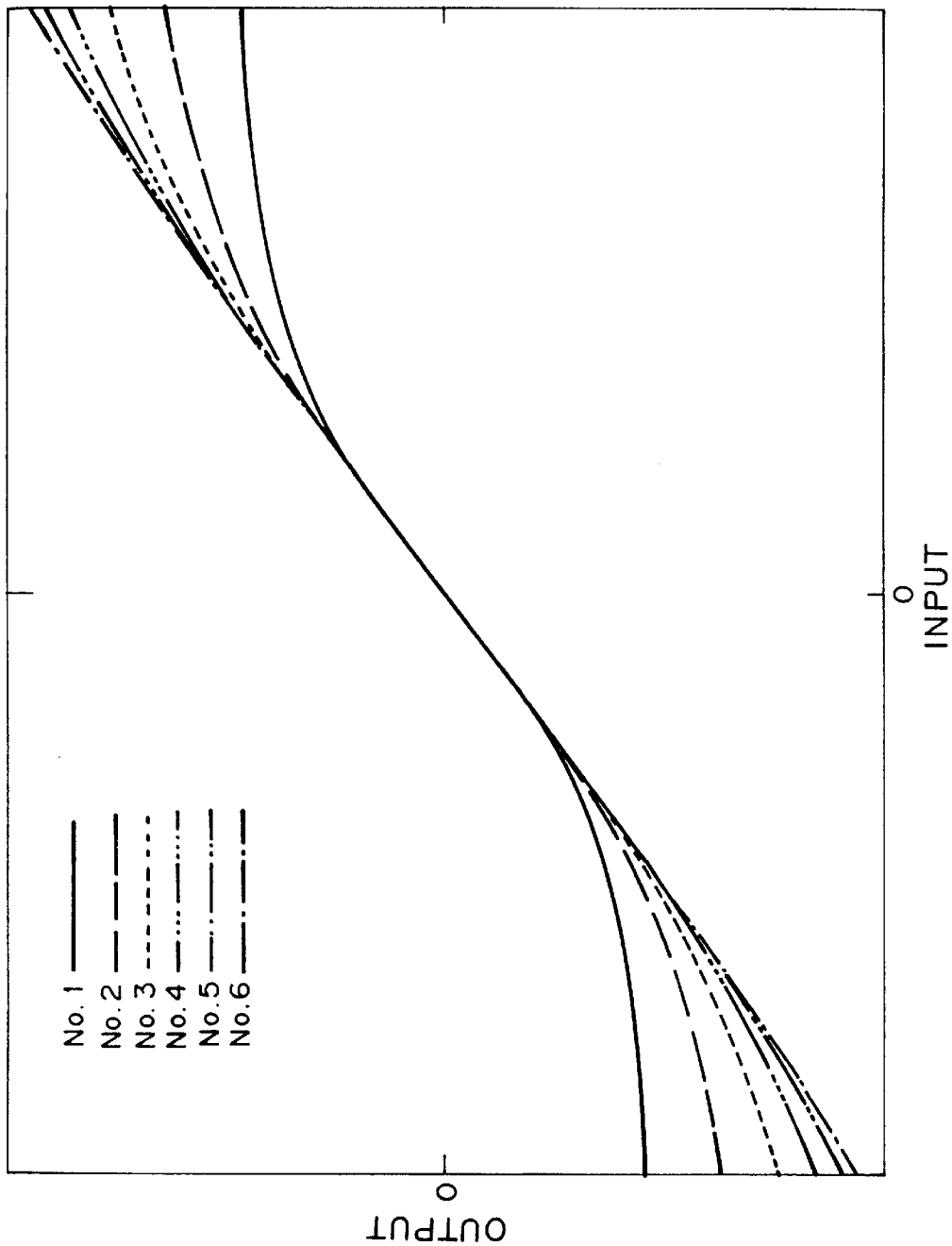
FIG. 8 is a graph showing examples of converting functions used in a converting process carried out on band pass signals.
Figure 9:
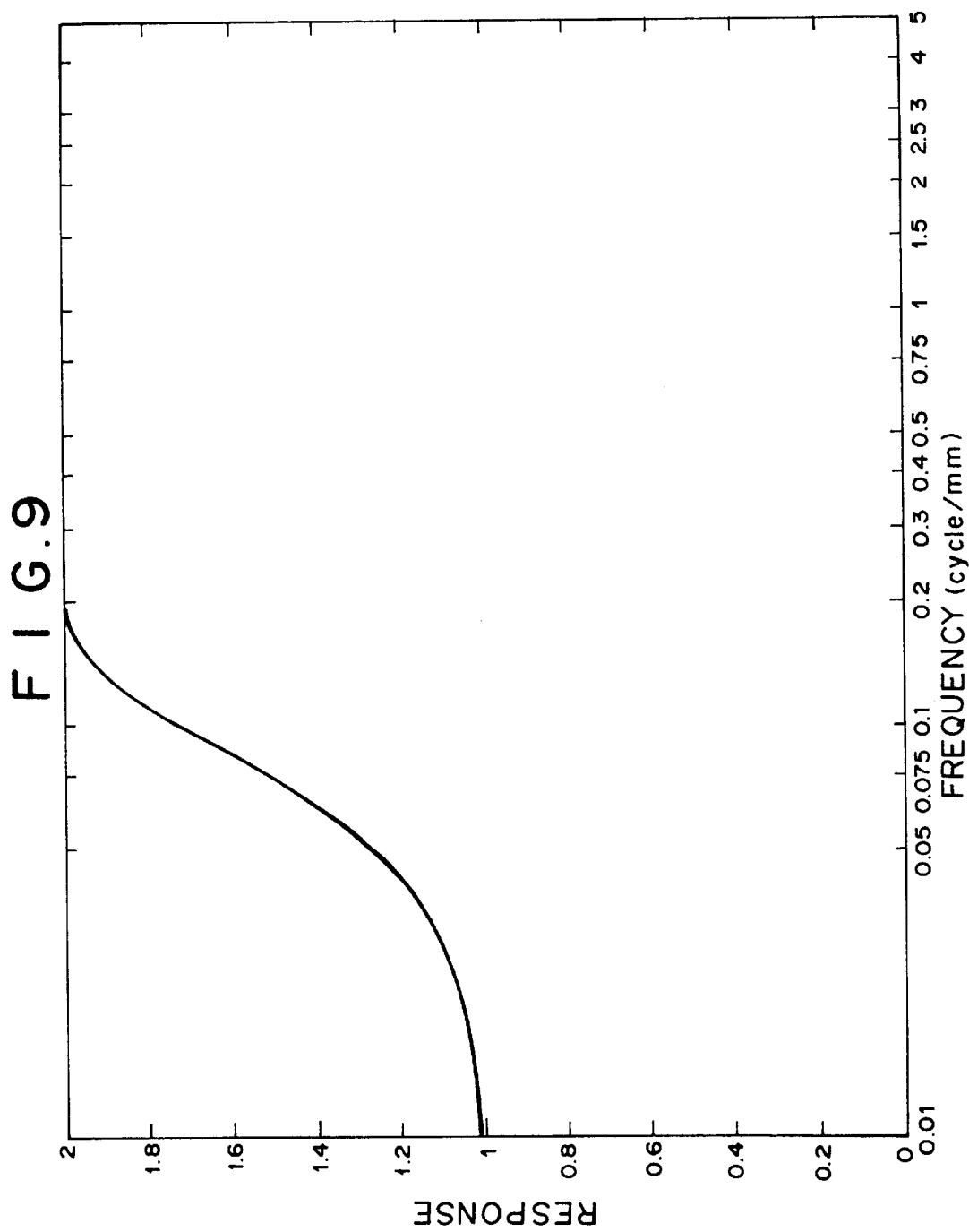
FIG. 9 is a graph showing frequency response characteristics of a processed image signal, which is obtained in cases where the converting functions shown in FIG. 8 are used in a converting process.
Figure 10:
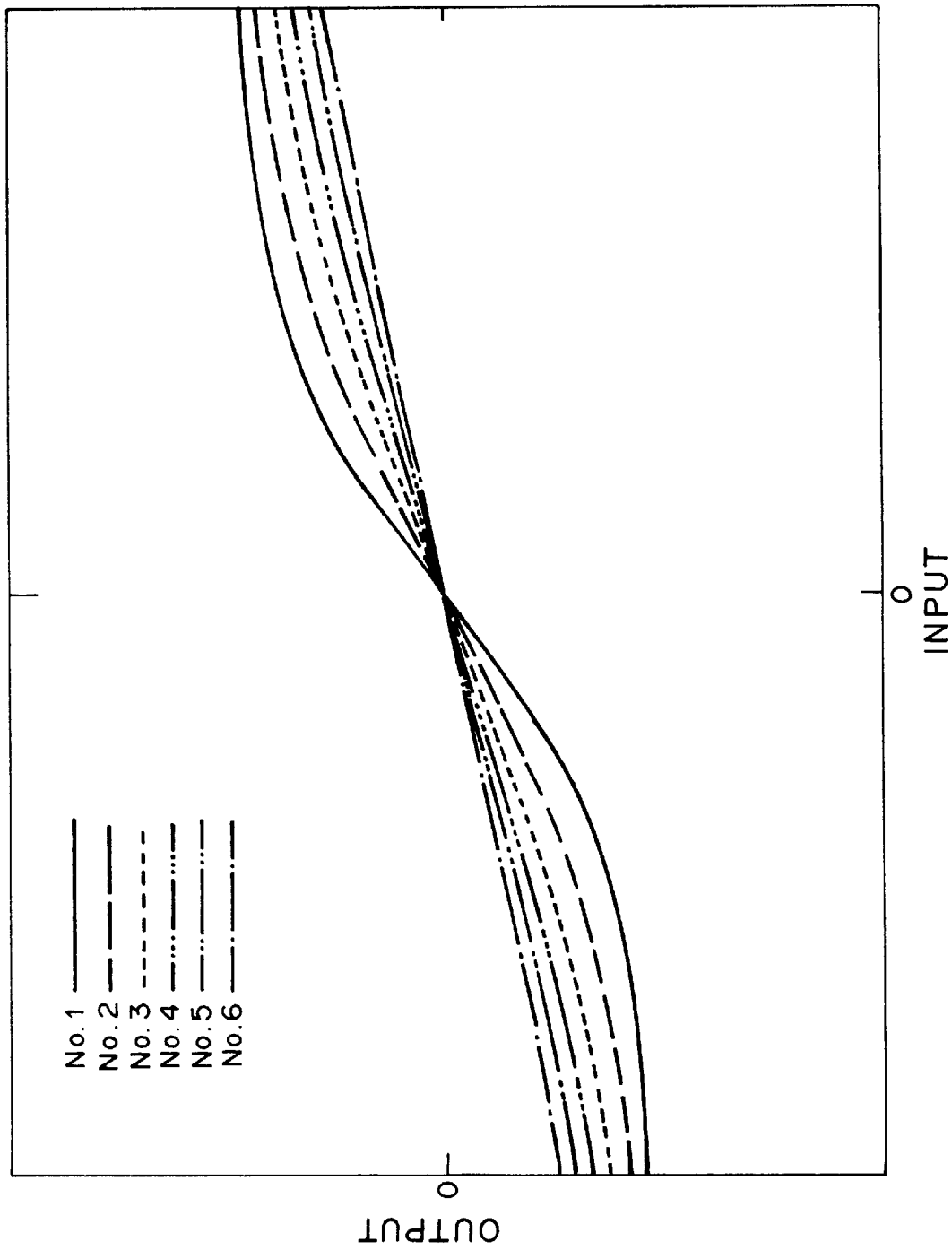
FIG. 10 is a graph showing different examples of converting functions used in a converting process carried out on band pass signals.
Figure 11:
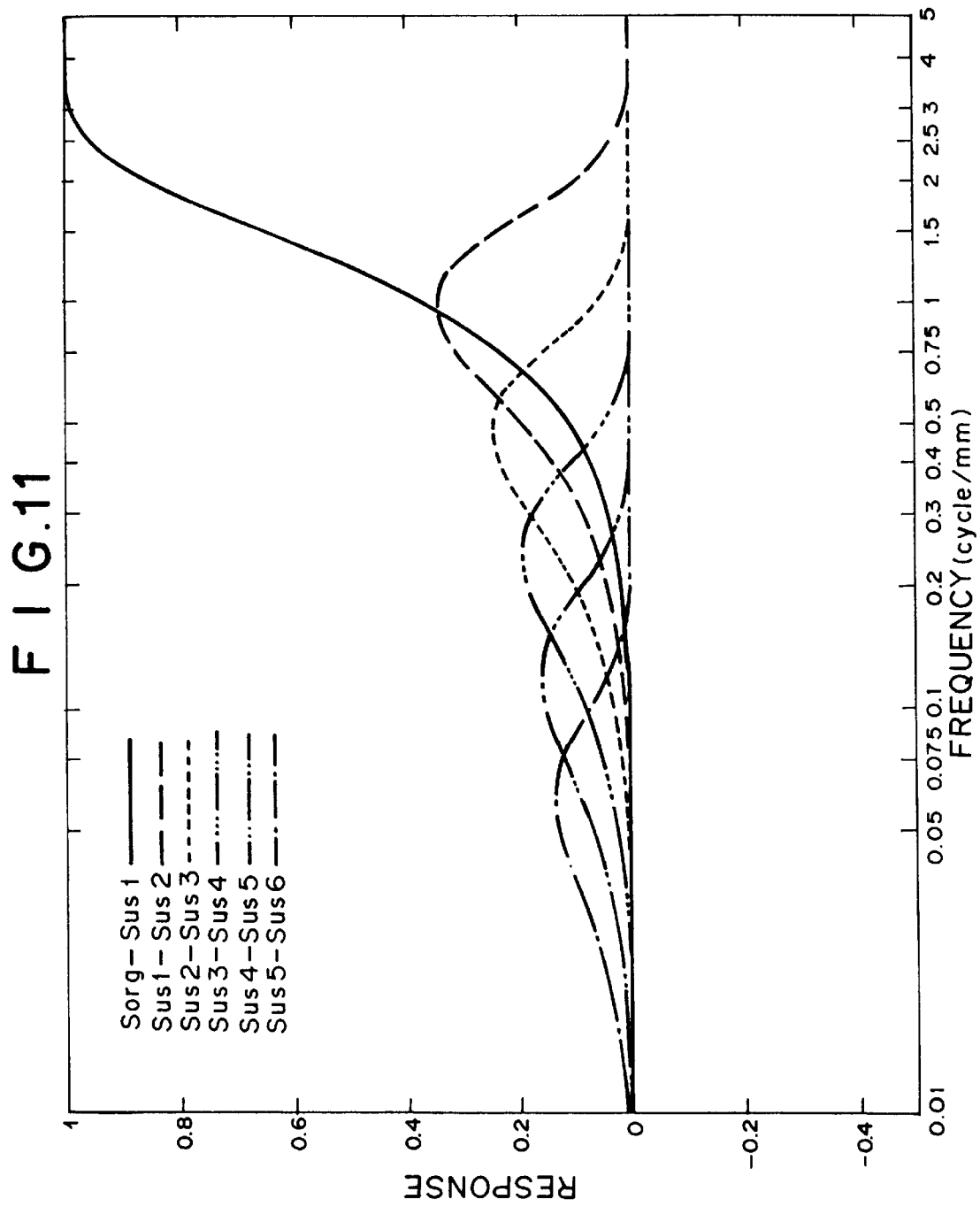
FIG. 11 is a graph showing frequency response characteristics of band pass signals of FIG. 7 after having been converted with the converting functions shown in FIG. 10.
Figure 12:
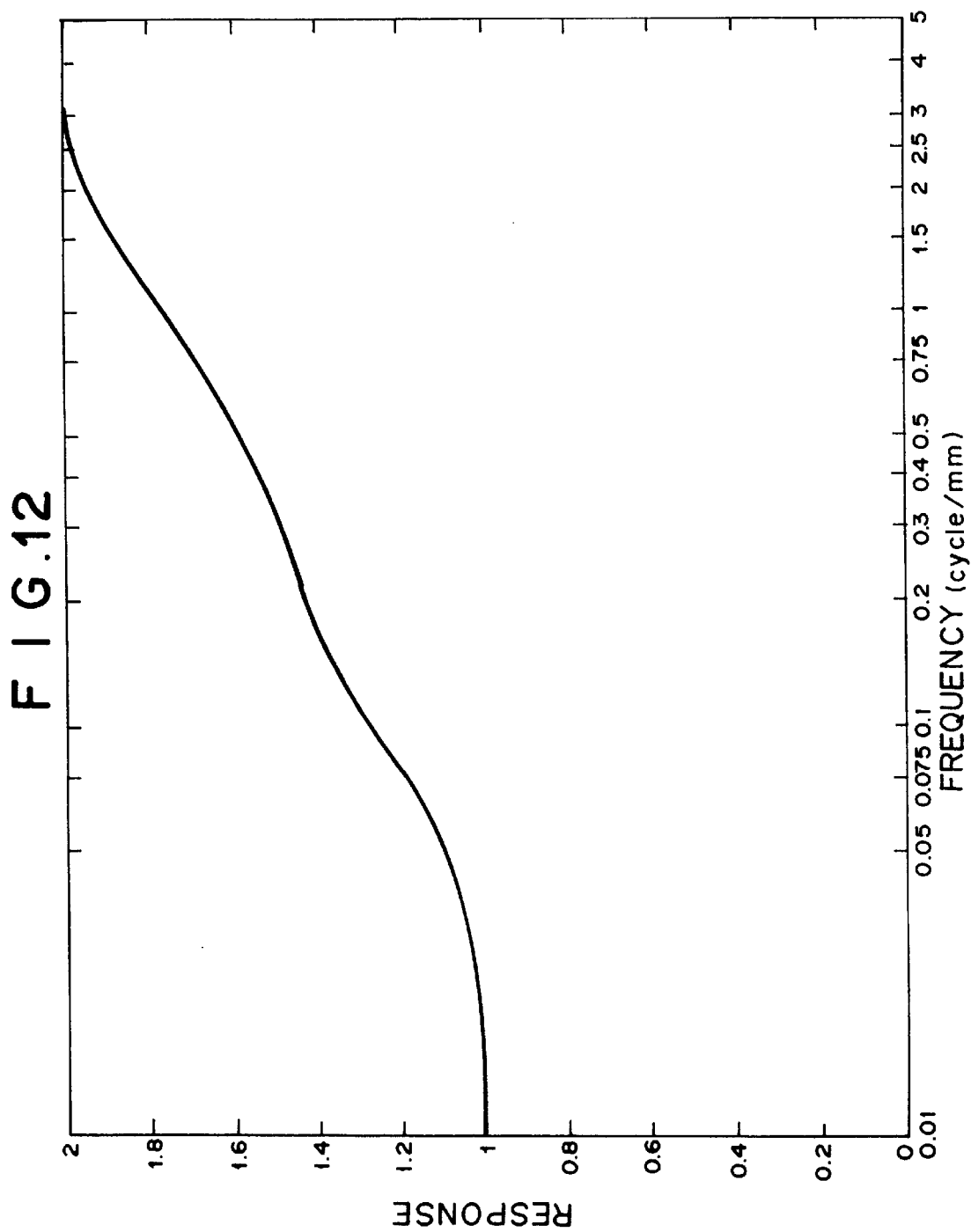
FIG. 12 is a graph showing frequency response characteristics of a processed image signal, which is obtained in cases where the converting functions shown in FIG. 10 are used in a converting process.

Two groups of converting functions and examples of the processed image signals, which are obtained by using them, will be described hereinbelow. FIG. 8 shows a group of the converting functions. In FIG. 8, No. 1 represents the converting function for converting the band pass signal (Sorg-Sus1) shown in FIG. 7, and No. 2 represents the converting function for converting the band pass signal (Sus1-Sus2) shown in FIG. 7. Thus a converting function of a large number represents the function for converting the band pass signal of a low frequency band. Each of the six band pass signals shown in FIG. 7 is converted with the corresponding one of the six converting functions shown in FIG. 8. FIG. 9 shows the frequency response characteristics of the processed image signal, which is thus obtained from the processing carried out in accordance with Formula (2) shown above in cases where the input signal value is small. FIG. 10 shows a different group of the converting functions. In FIG. 10, as in FIG. 8, a converting function of a large number represents the function for converting the band pass signal of a low frequency band. In cases where the converting functions shown in FIG. 10 are employed, the band pass signals having the frequency response characteristics shown in FIG. 7 are converted respectively into the signals having the frequency response characteristics shown in FIG. 11, and a processed image signal having the frequency response characteristics shown in FIG. 12 is obtained.

As will be clear from the example described above, a processed image signal having desired frequency response characteristics can be obtained by adjusting the converting functions. However, it is not necessarily easy to find that, if the converting functions shown in FIG. 8 are altered to the converting functions shown in FIG. 10, the frequency response characteristics of the resulting processed image signal will change from those shown in FIG. 9 to those shown in FIG. 12. Specifically, heretofore, converting functions, with which a processed image signal having desired frequency response characteristics can be obtained, must be found by adjusting the parameters, such as the inclinations of the converting functions, through trial and error.

The image processing method and apparatus in accordance with the present invention solves the problems described above. The means for solving the problems described above, i.e. the frequency response characteristics input means 5 and the converting function defining means 4 shown in FIG. 1, will be described hereinbelow. The frequency response characteristics input means 5 prompts the user through a display device, such as a CRT display device, to input the information representing the desired frequency response characteristics, and recognizes the desired frequency response characteristics from the inputted information. Specifically, the frequency response characteristics input means 5 may be constituted of software functions for carrying out such processing, an input device, a display device, and the like.

FIGS. 13A, 13B, 13C, and 13D are explanatory views showing an example of a user interface for specifying the frequency response characteristics. In this embodiment, as illustrated in FIGS. 13A, 13B, 13C, and 13D, a display device provided with an operation screen is employed. As illustrated in FIG. 13A, a characteristic curve representing the frequency response characteristics of a signal, which is obtained in cases where the input signal is processed with currently set converting functions, is displayed on the operation screen. Six indicative points, which can be moved, are displayed on the characteristic curve. Specifically, in cases where the nonlinear processing is carried out by forming n number of band pass signals, n number of indicative points are displayed on the characteristic curve.

As illustrated in FIG. 13B, the user moves each indicative point to a point corresponding to a desired frequency response by using, for example, a pointing device, such as a mouse device. If the displayed frequency response is the desired one, the indicative point need not necessarily be moved. From the indicative points having been specified after the moving operation (including the indicative points which were not moved), the frequencies corresponding to the indicative points and the desired frequency responses at the frequencies are recognized. A calculation is then made to find a new characteristic curve from the recognized frequencies and the desired frequency responses. As illustrated in FIG. 13C, the new characteristic curve, which passes through the indicative points having been specified after the moving operation, is displayed on the operation screen. Thereafter, as illustrated in FIG. 13D, on the screen for confirmation, the user can instruct the execution of the image processing in cases where the newly displayed characteristic curve is the desired one. In cases where the newly displayed characteristic curve is not the desired one, the user can again carry out the operation for moving the indicative points.

The frequency response characteristics input means 5 is not limited to the example described above and may be constituted in one of various other ways. For example, several frequency levels may be displayed one after another on an operation screen, and the user may successively input the desired frequency response characteristics as numerical values with respect to each of the several frequency levels.

How the converting function defining means 4 operates will be described hereinbelow. In this embodiment, as described above, the processing is carried out by using the six band pass signals. Therefore, the desired frequency response characteristics, which have been inputted with the user interface described above, are allocated as a1 through a6 to simultaneous equations of Formula (5) shown below.

$$a1 = p1 \times S11 + p2 \times S21 + p3 \times S31 + p4 \times S41 + p5 \times S51 + p6 \times S61$$

$$a2 = p1 \times S12 + p2 \times S22 + p3 \times S32 + p4 \times S42 + p5 \times S52 + p6 \times S62$$

$$a3 = p1 \times S13 + p2 \times S23 + p3 \times S33 + p4 \times S43 + p5 \times S53 + p6 \times S63$$

$$a4 = p1 \times S14 + p2 \times S24 + p3 \times S34 + p4 \times S44 + p5 \times S54 + p6 \times S64$$

$$a5 = p1 \times S15 + p2 \times S25 + p3 \times S35 + p4 \times S45 + p5 \times S55 + p6 \times S65$$

$$a6 = p1 \times S16 + p2 \times S26 + p3 \times S36 + p4 \times S46 + p5 \times S56 + p6 \times S66$$

$$p1 \text{ to } p6 \geq 0$$

(5)

wherein a1 through a6 represent the frequency responses having been specified as the desired values, S11 through S66 represent the frequency response characteristics of the band pass signals having been formed from the original image signal, and p1 through p6 represent the parameters which represent the inclinations of the converting functions in the vicinity of 0.

The dimension of the equations is determined by the number of the band pass signals, i.e. the number of the specified values. Formula (5) shown above is a mere example.

The converting function defining means 4 solves the simultaneous equations, such as those of Formula (5), by taking the specified frequency response characteristics a1 through a6 and the frequency response characteristics S11 through S66 of the band pass signals as known values, and taking the parameters p1 through p6 as variables. The converting function defining means 4 thus calculates the parameters and thereby defines the converting functions. In Formula (5), of the values indicated as the frequency response characteristics S11 through S66 of the band pass signals, each of the group of S11 through S16, the group of S21 through S26, . . . , the group of S61 through S66 corresponds to the response characteristics of a single band pass signal with respect to the six predetermined frequency levels. The frequency response characteristics S11 through S66 of the band pass signals can be calculated from the filter factor of the filter and the interpolation factor, which are employed in the formation of the unsharp mask image signals, by using a converting technique, such as Fourier transform, which is ordinarily utilized in frequency analysis. The calculation of the frequency response characteristics S11 through S66 of the band pass signals may be made each time the aforesaid simultaneous equations are solved. Alternatively, the frequency response characteristics S11 through S66 of the band pass signals may be calculated previously, and the information representing the results of the calculation may be stored in a memory.

Also, in this embodiment, the parameters p1 through p6 of the converting functions represent the inclinations of the functions, which convert the band pass signals, in the vicinity of 0. This is because the range actually used for the converting process is in the vicinity of 0. Even though each function is a nonlinear function, a predetermined range in the vicinity of 0 may be approximately represented by a linear function, and the value representing the inclination of the linear function may be employed as the parameter in the equations shown above. However, the parameters for defining the converting functions are not limited to the inclinations of the functions.

In cases where the image processing is carried out by the nonlinear processing means 3 and in accordance with the converting functions having been defined in the manner described above, the processed image signal, which has the frequency response characteristics specified by the user, can be obtained immediately. Specifically, with the image processing method and apparatus in accordance with the present invention, it is not necessary to carry out the operation of trial and error for the definition of the converting functions as in the conventional techniques. Therefore, even the users having little experience can easily carry out the desired image processing by fully utilizing the functions of the image processing apparatus, such that a desired processed image signal may be obtained. Further, both for the users having little experience and for the experienced users, the time required to carry out the work can be kept short. Thus the image processing method and apparatus in accordance with the present invention has large effects for use in practice.

What is claimed is:

1. An image processing method, comprising the steps of:
   i) forming a plurality of unsharp mask image signals, which have different frequency response characteristics, from an original image signal representing an original image,
   ii) forming a plurality of band-limited image signals, each of which represents one of signals falling within a plurality of different frequency bands of the original image signal, from the original image signal and the plurality of the unsharp mask image signals, or from the plurality of the unsharp mask image signals,
   iii) converting each of the band-limited image signals in accordance with one of a plurality of converting functions, a plurality of converted image signals being thereby formed,
   iv) integrating the plurality of the converted image signals, an integration signal being thereby obtained, and
   v) adding the integration signal to the original image signal, whereby a processed image signal, in which predetermined frequency components of the original image signal have been emphasized, is obtained,
   wherein the improvement comprises the steps of:
   a) specifying desired frequency response characteristics of the processed image signal, and
   b) determining definition parameters for the converting functions in accordance with the specified frequency response characteristics, the converting functions being thereby defined.

2. A method as defined in claim 1 wherein said definition parameters for the converting functions are determined by solving relational expressions of frequency response characteristics of the band-limited image signals, said desired frequency response characteristics having been specified, and said definition parameters for the converting functions, as simultaneous equations, in which the frequency response characteristics of the band-limited image signals and said desired frequency response characteristics having been specified are taken as known values, and in which said definition parameters for the converting functions are taken as variables, and thereby calculating said definition parameters.

3. An image processing apparatus, comprising:
   i) an unsharp mask image signal forming means for forming a plurality of unsharp mask image signals, which have different frequency response characteristics, from an original image signal representing an original image, and
   ii) a nonlinear processing means for:
      forming a plurality of band-limited image signals, each of which represents one of signals falling within a plurality of different frequency bands of the original image signal, from the original image signal and the plurality of the unsharp mask image signals, or from the plurality of the unsharp mask image signals,
      converting each of the band-limited image signals in accordance with one of a plurality of converting functions, a plurality of converted image signals being thereby formed,
      integrating the plurality of the converted image signals, an integration signal being thereby obtained, and
      adding the integration signal to the original image signal, whereby a processed image signal, in which predetermined frequency components of the original image signal have been emphasized, is obtained,
   wherein the improvement comprises the provision of:
   a) a frequency response characteristics input means for specifying desired frequency response characteristics of the processed image signal, and
   b) a converting function defining means for determining definition parameters for the converting functions in accordance with the specified frequency response characteristics, and thereby defining the converting functions.

4. An apparatus as defined in claim 3 wherein said converting function defining means determines said definition parameters for the converting functions by solving relational expressions of frequency response characteristics of the band-limited image signals, said desired frequency response characteristics having been specified, and said definition parameters for the converting functions, as simultaneous equations, in which the frequency response characteristics of the band-limited image signals and said desired frequency response characteristics having been specified are taken as known values, and in which said definition parameters for the converting functions are taken as variables, and thereby calculating said definition parameters.

* * * * *